Feb. 13, 1934. J. MIKULASEK 1,947,420
CLUTCH MECHANISM
Filed Sept. 9, 1929 2 Sheets-Sheet 2

Inventor:
John Mikulasek
By: Wallace R. Lane
Atty.

Patented Feb. 13, 1934

1,947,420

UNITED STATES PATENT OFFICE 1,947,420

CLUTCH MECHANISM

John Mikulasek, Newton, Iowa, assignor to The Maytag Company, Newton, Iowa, a corporation of Delaware Application September 9, 1929. Serial No. 391,167

15 Claims. (Cl. 192—103)

The present invention relates to clutch mechanisms.

Among the objects of the invention is to provide a novel clutch mechanism for manually effecting a driving connection between relatively movable members when one of the members, which is operatively connected with a source of power, has reached a predetermined speed.

A further object of the invention is to provide a novel clutch mechanism for the transmission of power from one rotary member to another and for allowing slippage during the interval when an engagement is being effected between these members.

The provision of means for permitting slippage between the movable members is very desirable inasmuch as the present invention comprehends the adaptability of the novel clutch mechanism in devices where it is necessary that the power means, such as an electric motor or the like, be allowed to attain a predetermined speed prior to its being operatively connected with the load under which it is to operate.

Such means for permitting slippage between these two movable members, one of which is operatively connected with the power means while the other is operatively connected to the load, eliminates the possibility of sudden fluctuations of current in the power line, as likewise an overheating in the armature and stator windings which would occur if the load were directly connected to the power means or the engagement between the movable members were effected substantially instantaneously.

The invention further comprehends the idea of providing a novel clutch mechanism wherein the engagement of the movable members is manually effected at the will of the operator for the operation of the power means under full load capacity after the operating speed thereof has been attained.

The invention still further comprehends the idea of providing a novel clutch mechanism for effecting an engagement between relative movable members and for movement in unison, and which will be released to disengage these members upon a relative angular movement of the same.

In an embodiment selected to illustrate the novel features of the present invention, the clutch mechanism is shown as comprising two relatively movable members mounted upon a shaft, one of these members being fixedly mounted thereon, while the other of the members is rotatably and slidably mounted on the shaft and operatively connected as by a belt or the like to a power source such as an electric motor, gas engine or the like. The member which is fixed to the shaft carries a circular clutch band which is adapted to contact a peripheral and overhanging flange of the rotatably and slidably mounted member to effect an engagement between the two members.

A pivotal member having an arm adapted to engage and expand this circular band for engagement with the rotatably mounted member is likewise carried by this member and has, at its other end, a roller means. When it is desired to effect an engagement between these movable members, the rotatably mounted member is slid, by any suitable shifting means along the shaft upon which it is mounted, for contact with the roller means. The idly rotating member upon contact with the roller means causes a movement of the same, as likewise a movement of the pivotal member whereby the band is expanded and an engagement of these members is effected. Resilient means between these two movable members slide the slidably mounted member into its normal inoperative position when the relative angular velocity between these members is such as to cause a disengagement of the expansible band and the other members frictionally engaged thereby. Upon a relative angular movement of these members, because of overloading or the like when the speed is accordingly decreased, the band is released by the pivotal means and the members are disengaged.

The invention also comprehends other objects, advantages, capabilities and features as will later appear, and are inherently possessed thereby.

Referring to the drawings.

Figure 1:
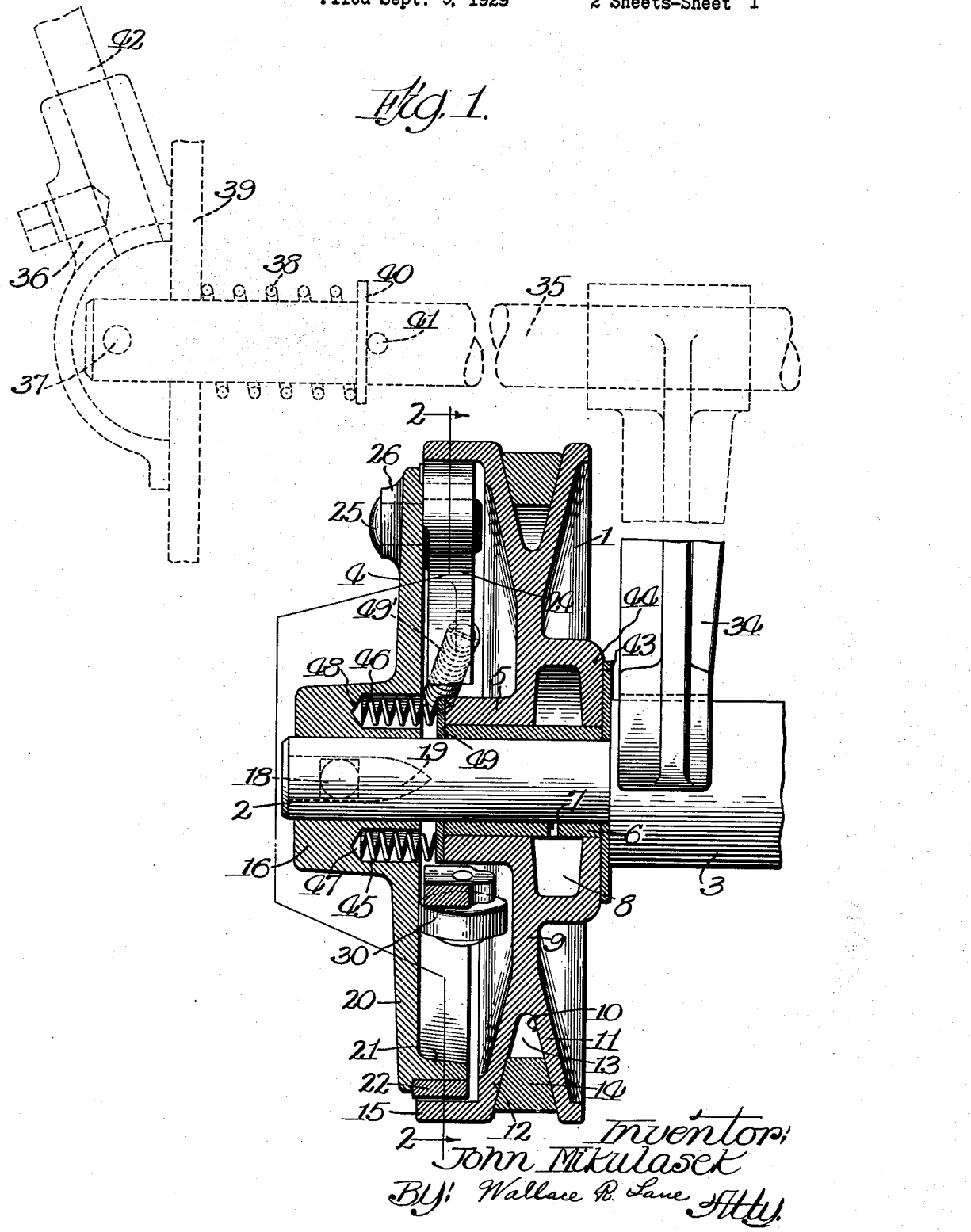
Fig. 1 is a longitudinal cross sectional view of an embodiment selected to illustrate the invention.

Referring now more in particular to the drawings, the embodiment selected to illustrate the invention is shown as comprising a pulley 1 rotatably and slidably mounted upon the end 2 of a shaft 3 and adapted to drive this shaft through a disk member 4 and clutch mechanism (to be further described) which is carried thereby.

The pulley 1 is provided with a hub 5 having pressed therein a bushing 6 through which is an opening 7 communicating with an annular chamber 8 in a portion of the hub for the storage of suitable lubricants which may work their way through this opening to lubricate the bushing and shaft. Integral with this hub is a web portion 9 extending radially therefrom and terminating to form a V-shaped peripheral portion 10 having walls 11 and 12 and annular V-shaped groove 13 about the pulley.

The pulley 1 is driven by a belt 14 which passes around the pulley and is engaged by the side walls 11 and 12 of the V-shaped annular groove 13, this belt being likewise passed around and driven by a sheave pulley mounted upon the shaft of an electrical motor, gas engine or other power means. The wall 12 of the V-shaped peripheral portion 10 has a depending laterally extending annular flange 15 normally rotating about a similar flange of the disc 4 when the pulley 1 idly rotates upon the end 2 of the shaft 3.

The disc 4 is provided with a hub 16 mounted upon the outer end 2 and spaced from the hub 5 of the pulley 1. This hub is provided with a threaded opening 17 engaged by a set screw or the like 18, the end of the set screw, when turned in the opening, being adapted to contact the flat surface 19 of the shaft for holding the disc rigid with the shaft.

Integral with and radially extending from the hub is a web 20 having a depending laterally extending annular flange 21, this annular flange being within and spaced from the annular flange 15 and having an opening 21ª for a purpose to be more fully explained.

Within this annular space between the flanges 15 and 21 of the relatively movable members 1 and 4 is a split band 22 for effecting an engagement between the pulley 1 and disc 4 for the driving of the latter and the shaft 3 when the pulley is driven by some source of power.

One end of this band is connected by means of a rivet or the like 23 to the flange 21 while the other end terminates within the space 21ª.

Normally and when the pulley 1 is rotating idly on the shaft 3 the band 22 is out of contact with the flange 15. For moving this band into frictional engagement with the flange 15 of the pulley 1 and for the movement of the disc 4 and pulley 1 in unison, means are provided for expanding the band thereby effecting an engagement of these relatively movable members. Such means comprise an arm or centrifugal governor 24, this governor being pivotally mounted on a pin or stud bolt 25 passing through and mounted in an opening in a boss 26 provided on the disc 4.

The governor 24 operates within an annular space 27 between the disc 4 and pulley 1 and has an arm 28 adapted to contact the free end of the band 22 which terminates within the space 21ª. The governer is provided with an arcuate shaped arm 29 which carries at its end a roller 30 connected to the arm by means of a rivet 31 or the like, this roller being adapted to contact the web 20 and to travel along the surface thereof.

Figure 2:
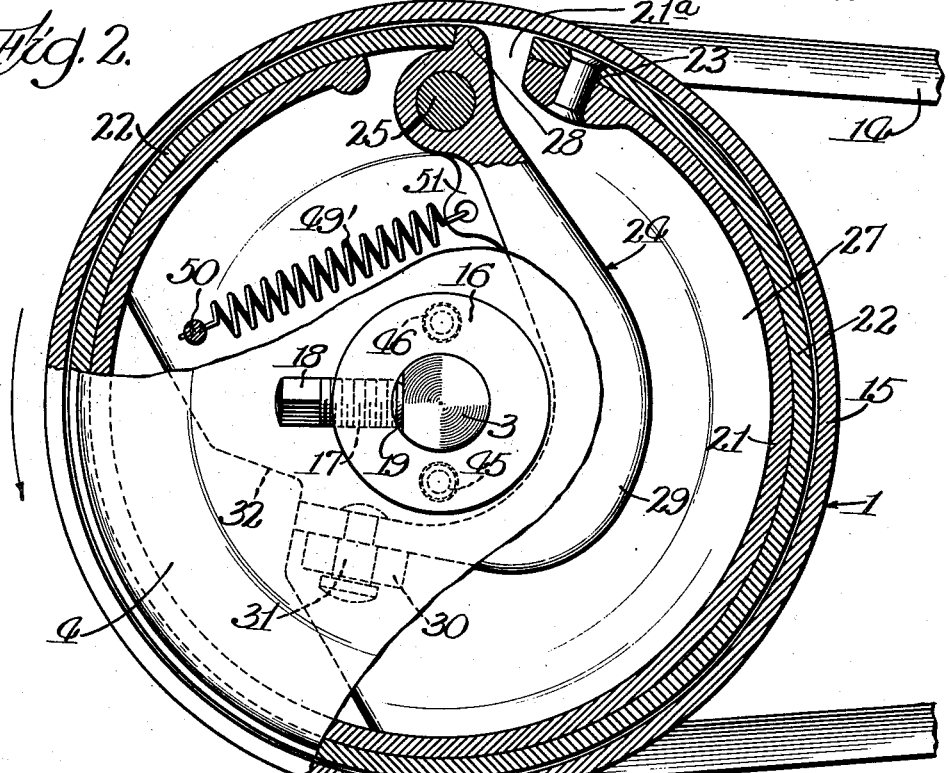
Fig. 2 is a vertical cross sectional view taken in the planes represented by line 2—2 of Fig. 1 and disclosing the clutch mechanism in its normal disengaged position.
Figure 3:
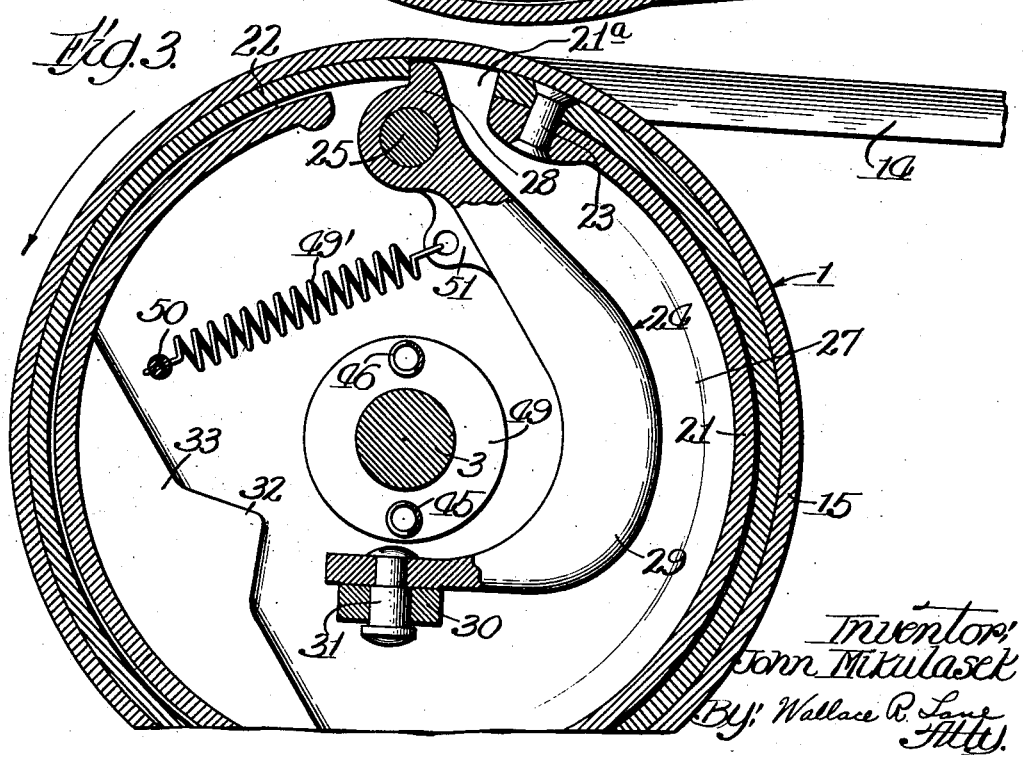
Fig. 3 is a vertical cross sectional view similar to Fig. 2 and showing the clutch mechanism in its normal engaged position.

When the pulley 1 is idly rotating on the shaft 3 and the clutch mechanism is in its normal inoperative position, as clearly shown in Fig. 2 of the drawings, the end of the arm 29 is adapted to contact and abut a lug 32 of a laterally extending portion 33 of the disc to provide a clearance space between the arm and the hub 5 to prevent these members from rubbing against one another. This extending portion likewise is of somewhat greater thickness than the adjacent portions of the disc to provide sufficient weight for equalizing the effect of the centrifugally throwing out of the arm or governor as shown in Fig. 3 of the drawings.

As previously stated, the pulley 1 is slidable on the end 2 of the shaft 3 and when so slid thereon and toward the roller 30 the surface of the web 9 contacts the roller 30, at which time the roller will travel along the surface of the web 20 thus causing the arm 28 to move and expand the band 22 to effect an engagement of the pulley 1 and disc 4 for their operation in unison.

For sliding the pulley 1 toward the roller 30 a shifter means is provided, this shifter means comprising a yoke 34 mounted upon a shaft or rod 35 which is adapted to be longitudinally moved by such means as a toggle shifter knuckle 36 connected to the rod 35 by means of a pin 37 upon which the knuckle rocks. The yoke 34 is held out of contact with the pulley 1 by means of a coiled spring 38 about the rod 35, one end of this spring abutting against a supporting member 39 through which the rod protrudes while the other end bears against a washer 40 held against movement by a dowel pin 41 through the shaft. The toggle knuckle is provided with a shifter lever 42 for operating the toggle knuckle and for movement of the yoke into or out of contact with the pulley 1. An anti-friction washer 43 is mounted upon the end portion 2 and adapted to contact the end wall 44 of the compartment 8 against which the yoke 34 may bear when the pulley 1 is being slid thereby.

When an engagement has been effected between the pulley 1 and disc 4, the yoke 34 may be released, by means of the shifter mechanism, from contact with the pulley. In order that the web 9 of the pulley may not rub against or contact the roller 30 when the pulley 1 rotates idly on the shaft 3, spring means 45 and 46 are provided and are enclosed within bores 47 and 48 in the hub 16 of the disc 4, one end of the spring seating in the end of the bore while the other end abuts or bears against a washer 49 mounted on the shaft and in contact with the inner end of the hub 5 of the pulley 1.

These resilient means insure against the possibility of the web 9 contacting the roller 30 and effecting an engagement between the pulley 1 and disc 4, except as desired by the operator.

When it is desired to effect an engagement of the pulley 1 and disc 4 the shifting means is operated to move the yoke 34 so as to contact the hub of the pulley and for sliding the same toward the disc 4 when the web 9 will contact with the roller 30. The roller will then move along the surfaces of both the webs 9 and 20 for moving the arm 29 of the governor outwardly with respect to the center of rotation. The arm 29 which is in contact with the end of the band 22 will cause an expansion of the same for frictional engagement with the flange 15 of the pulley to gradually increase the speed of the disc 4 and shaft 3 to the speed of the idly rotating pulley. When the band 22 is in contact with the flange 15 the disc 4 and pulley 1 will move or rotate in unison, but if for any reason there is a decrease in the speed of either one of these members below normal operating speed whereby to cause a relative angular movement therebetween, the centrifugal governor or arm 24 will move toward its initial starting position as shown in Fig. 2 of the drawings to release the band from its frictional contact with the flange 15. Upon its release the band 22 will contact about the periphery of the flange 21 to provide clearance space for movement of the flange 15 thereabout and to permit the idle rotation of the pulley 1 on the shaft 3. It is to be understood that during normal operation and after the shifting means and yoke 34 have been released, the roller 30 is no longer held in contacting engagement with the web 9 of the pulley 1 by reason of the springs 45 and 46 bearing against the hub 5 and forcing the pulley and web toward the washer 43. Thus the governor is free to release the band upon a decrease in speed of the disc 4, caused either by an overload on the shaft 3 and communicated thereby to the disc, or by an overload on the pulley 1 whereby its speed of rotation would be reduced below normal, and such reduction would be communicated to the disc.

Because of the resiliency of the band 22 pressure will be exerted upon the arm 28 of the centrifugal governor for its return to its normal starting position, but in order that this return may be accomplished for the quick and positive disengagement of the pulley and disc, a coiled spring 49' having an end connected to a lug 50 in the web 20 with its other end hooked in a lug 51 of the arm 29 for moving the arm toward the center of rotation.

While I have herein described and upon the drawings shown an illustrative embodiment of the invention, it is to be understood that the latter is not limited thereto, but comprehends other details, arrangement of parts, features and construction without departing from the spirit thereof.

Having thus disclosed the invention, I claim:

1. A clutch mechanism comprising relatively movable members, means carried by one of said members and for frictional engagement with the other member, pivotal means movable by said other member for moving said first mentioned means to operate said members in unison, and manual means for moving said other member into engagement with said pivotal means, said pivotal means automatically releasing said frictional means upon a reduction in the speed of one of said members below normal.

2. A clutch mechanism comprising relatively movable members, engaging means associated with said members for movement of said members in unison, pivotal means carried by one of said members and frictionally movable by the other of said members to effect an engagement of said means and members and maintain said engagement during normal operation, said pivotal means adapted to release said engaging means upon a reduction in the speed of one of said members below normal.

3. A clutch mechanism comprising relatively movable members, an expansible means associated with said members for movement of the members in unison, and movable means carried by one of said members and frictionally engaged by the other of said members for expanding said expansible means to effect an engagement of said members, said expansible means being automatically released by said movable means upon a reduction in the speed of one of said members below normal.

4. A clutch mechanism comprising relatively movable members, an expansible means carried by one of said members for movement of the members in unison, and movable means movable by the other of said members for expanding said expansible means to effect engagement of both of said members and maintain said engagement during normal operation, said expansible means being released by said movable means upon a reduction in the speed of said members below normal and manual means for engaging said other member with said movable means.

5. A clutch mechanism comprising relatively movable members, an expansible means connected to one of said members to effect engagement of both of said members to operate in unison, and means including a roller pivotally mounted on one of said members and frictionally movable by the other of said members for expanding said expansible means, said expansible means being automatically released by said pivotal means upon a reduction in the speed of said members below normal.

6. A clutch mechanism comprising relatively movable members, engaging means carried by one of said members to effect engagement of both of said members to operate in unison, pivotal means including a roller movable by the other of said members for movement of said engaging means, said engaging means being automatically released by said pivotal means when the speed of said members decreases below normal operating speed.

7. A clutch mechanism comprising, a shaft, relatively movable members thereon, engaging means associated with said members to effect engagement of both of said members to operate in unison, pivotal means carried by one of said members and provided with a roller for movement of said engaging means, the other of said members being slidable on said shaft for contacting said roller whereby to move said pivotal means, said engaging means being released by said pivotal means upon a reduction in the speed of either of said members below normal.

8. A clutch mechanism comprising a shaft, relatively movable members thereon, expansible means carried by one of said members to effect engagement of both of said members to operate in unison, pivotal means including a roller for expanding said expansible means, the other of said members being slidable for contacting said roller and for movement of said pivotal means, said expansible means being released by said pivotal means upon a reduction in the speed of either of said members below normal.

9. A clutch mechanism comprising relatively movable members, an expansible means carried by one of said members, means pivotally connected to said member and engaging an end of said expansible means, and means for moving the other of said members into contact with said pivotal means for movement of said pivotal means and for expansion of said expansible means whereby an engagement between said members is effected for movement thereof in unison, said engagement being maintained by said pivotal means during normal operating speed of said members.

10. A clutch mechanism comprising relatively movable members, a shaft upon which one of said members is keyed and upon which the other member is free to rotate, an expansible band on one of said members, a governor pivotally mounted on said one member and adapted to contact said band for expanding the same, and a roller on said governor adapted to be contacted by said other member to cause said governor to contact and expand said band whereby said members are moved in unison.

11. A clutch mechanism comprising relatively movable members, a shaft upon which one of said members is keyed and upon which the other member is free to rotate, an expansible band on one of said members, a governor pivotally mounted on said one member and adapted to contact said band for expanding the same, and a roller on said governor adapted to be contacted by said other member to cause said governor to contact and expand said band whereby said members are moved in unison.

12. A clutch mechanism comprising relatively movable members, a shaft upon which one of said members is keyed and upon which the other member is free to rotate, an expansible band on one of said members, a governor pivotally mounted on said one member and adapted to contact said band for expanding the same and having a roller adapted to be frictionally engaged by said other member to cause said governor to contact and expand said band whereby said members are moved in unison.

13. A clutch mechanism comprising relatively movable members, a shaft upon which one of said members is keyed and upon which the other member is free to rotate, and a centrifugally operated coupling means on the former member and movable by the latter and adapted to connect said members whereby they move in unison and to maintain them in such connected relation until the speed of one of said members is decreased below normal operating speed.

14. A clutch mechanism comprising a driving and a driven member, a clutch band on said driven member and adapted to frictionally engage said driving member, a pivotal member on said driven member, said pivotal member being provided at one end with an arm adapted to engage and expand said band and at the other end with a roller, and means to move said driving member into contact with said roller whereby to cause said arm to expand said band and clutch said members together, said pivotal means being adapted to automatically release said band upon a reduction in the speed of one of said members below normal.

15. A clutch mechanism comprising a driving and a driven member, a circular clutch band on said driven member and adapted to frictionally engage said driving member, a governor pivotally mounted on said driven member, said governor being provided at one end with an arm adapted to engage and expand said band and at the other end with roller means, means to move said driving member into contact with said roller means whereby to cause said arm to expand said band and clutch said members together, and means to release said roller from said driving member, said governor being adapted to release said band upon a reduction in the speed of one of said members below normal.

JOHN MIKULASEK.